Jan. 19, 1926.  
A. DE CONINCK  
1,570,210  
STABILIZING DEVICE FOR AUTOMOBILE UNDERFRAMES  
Filed Dec. 3, 1924
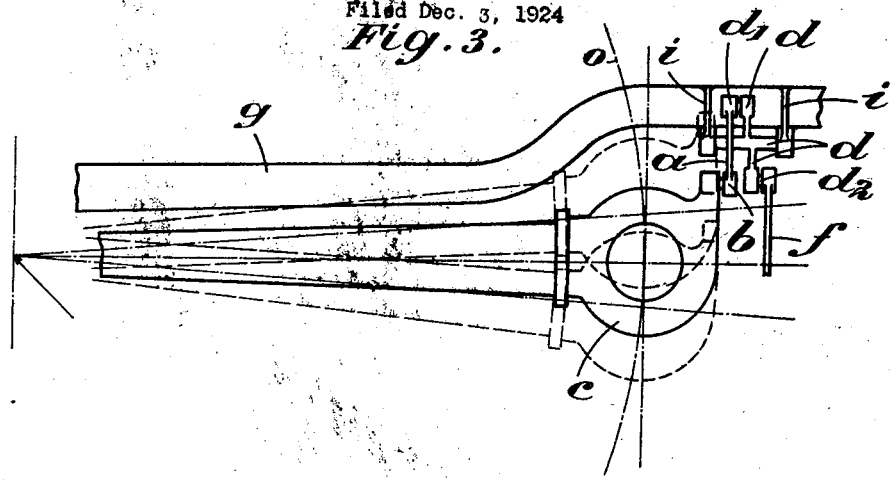
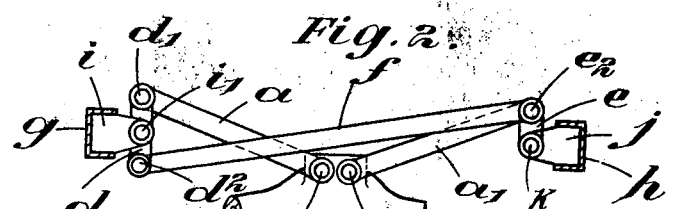
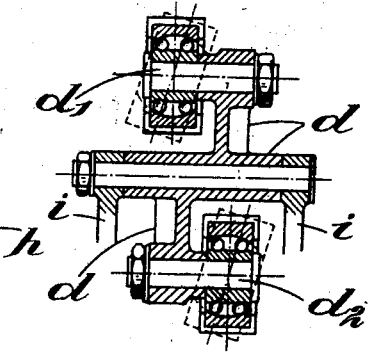
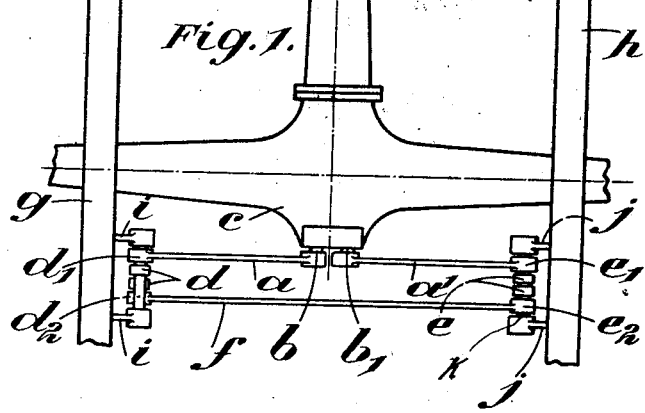
Inventor  
Arthur De Coninck  
By  
B. Singer, Atty.

Patented Jan. 19, 1926.

1,570,210

UNITED STATES PATENT OFFICE.

ARTHUR DE CONINCK, OF BRUSSELS, BELGIUM.

STABILIZING DEVICE FOR AUTOMOBILE UNDERFRAMES.

Application filed December 3, 1924. Serial No. 753,711.

*To all whom it may concern:*

Be it known that I, ARTHUR DE CONINCK, a subject of the King of Belgium, and resident of 51, rue des Aduatiques, Brussels, Belgium, have invented new and useful Improved Stabilizing Devices for Automobile Underframes, of which the following is a specification.

In a preceding Patent No. 1,404,585 there was described a jointed connecting device between the underframe and the axle of automobiles for the purpose of stabilizing the said underframe with respect to the said axle and thus preventing lateral movement of the former relative to the latter, in other words: to diminish the "rolling" motion of the underframe.

This device consisted in connecting the middle of the axle to the longitudinal bearers of the underframe by two connecting rods each jointed to a lever pivoted to the corresponding longitudinal bearer of the underframe, the said levers being connected together by a reverse connecting rod.

The purpose of the improved device constructed according to the present invention is to greatly improve the characteristics of the above mentioned device and particularly to free the connecting rods from the torsional stresses due to the movements of the axle in a direction longitudinal to the underframe, which occur when the suspension springs bend.

Furthermore, the new device comprises certain improvements enabling it to be more easily fitted to the axle and to the underframe of a vehicle.

For the above purposes, the invention consists principally in replacing all the cylindrical pivot joints which were provided for the connecting rods, by ball and socket joints, so as to enable the said connecting rods to swing in any direction, but with a limited amplitude, on the pivots connecting the said rods to the axle and to the oscillating lever.

A form of construction of a stabilizing device embodying the invention is shown by way of example on the accompanying drawing, in which:

Figure 1 is a plan view of the new stabilizer fitted to the underframe and to the axle of a vehicle, Figure 2 is a rear elevation of the axle, Figure 3 is a partial elevation lengthwise of the underframe.

Figure 4 is a section showing the ball and socket joint between the connecting rods and the pivots in one of the oscillating levers.

In the figures, $a$ and $a^1$ designate two connecting rods jointed respectively to the pivots $b$ and $b_1$ mounted towards the middle of the axle member $c$. In addition, the connecting rod $a$ is jointed to an oscillating lever $d$ having two opposite arms, which lever is pivoted to a support $i$ attached to the longitudinal bearer $g$. The bearer $h$ is provided with a pair of spaced supports $j$ similar to the support $i$. A pivot $k$ connects the support $j$ and is similar to the pivot connecting the support $i$ shown in Figure 4. A substantially U-shaped oscillating lever $e$ is mounted on the pivot $k$. The connecting rod $a^1$ is pivotally connected to one arm of the lever $e$ as at $e'$. A reversing rod $f$ is pivotally connected at one end to the second arm of the first lever $d$ and at the opposite end to the arm of the oscillating lever $e$, as at $e^2$.

The articulation between the connecting rods $a$, $a^1$ and $f$ and the pivots $b$, $b_1$ on the axle member as well as the pivots $d_1$, $d_2$ in the lever $d$ and the pivots $e_1$, $e_2$ on the double lever $e$ is made by means of a ball and socket joint or preferably by a ball bearing forming an equivalent joint as shown by way of example in Figure 4.

It will be understood in particular that the application of a ball and socket joint at each end of the connecting rods $a$ and $a^1$ will allow the axle $c$ to move lengthwise of the underframe without causing the said connecting rods to be exposed to bending or torsional stresses.

It is to be noted that when the suspension springs bend, the center of the axle does not move along a vertical line but along an arc of a circle $o$ as shown in Figure 3.

What I claim is:

A stabilizing device assuring the stabilization of the underframe with respect to the axle in automobile vehicles and the like, which device comprises in combination: two horizontal pivots symmetrically provided on both sides of the middle of the axle member, a lever with two opposite arms pivoted intermediate its ends to a support secured to one of the longitudinal bearers of the underframe, a lever having two parallel arms which lever is pivoted to a support attached to the other longitudinal bearer of the underframe, a pivot provided to the end of each of these arms, two rods connecting respectively one of the pivots of the axle member to the pivot of one of the arms of each lever, a third rod connecting the pivots of the other arm of the two levers and an articulation between the ends of each rod and the pivots connected by said rods.

In witness whereof I affix my signature.

ARTHUR DE CONINCK.